United States Patent [19]

Schreiber

[11] 3,725,937
[45] Apr. 3, 1973

[54] RADAR SYSTEM FOR DETERMINING THE ANGULAR DEVIATION OF A TARGET FROM A REFERENCE LINE

[75] Inventor: Olaf Schreiber, Ulm/Donau, Germany

[73] Assignee: Telefunken Patentverwertungsgesellschaft m.b.H., Ulm/Donau, Germany

[22] Filed: May 25, 1964

[21] Appl. No.: 370,126

[30] Foreign Application Priority Data

May 25, 1963 Germany..............................T 24057

[52] U.S. Cl.................343/120, 343/16 LS, 343/913
[51] Int. Cl..................................................G01s 3/16
[58] Field of Search.343/754, 755, 701, 913, 100.11, 343/16.2, 120

[56] References Cited

UNITED STATES PATENTS 2,659,082   11/1953   Pearson..................................343/120
2,730,710   1/1956    Loeb..............................343/16.2 UX
2,929,058   3/1960    Blasberg et al......................343/16.2
2,988,741   6/1961    Brown et al..........................343/754

*Primary Examiner*—Benjamin A. Borchelt
*Assistant Examiner*—Richard E. Berger
*Attorney*—Spencer & Kaye

[57] ABSTRACT

A radar system for determining the angular deviation of a target from a reference line. In an exemplary embodiment, an antenna arrangement is switched between at least two states which result in at least two respective radiation patterns having axes of symmetry at an angle to the optical axis of the antenna. The incoming signals are passed through a single receiving channel and are separated, in synchronism with the rate at which the antenna is switched to produce the different radiation patterns. The amplitude relation of successive separate signals is determined from which there is derived an error signal which is proportional to the angular deviation.

28 Claims, 11 Drawing Figures

INVENTOR
Olaf Schreiber

BY Spencer & Kaye
ATTORNEYS

RADAR SYSTEM FOR DETERMINING THE ANGULAR DEVIATION OF A TARGET FROM A REFERENCE LINE

The present invention relates to a method and apparatus for determining the angular deviation of a target from a straight reference line, e.g., an azimuthal deviation.

It is often necessary, in the case of a radar set, and, more particularly, in the case of a search head used in radar, to determine the angular deviation of a target, i.e., the angle formed between the line of sight to the target and a straight reference line, particularly the optical axis or so-called boresight of the antenna system. This is done conventionally in one of two ways:

In the case of monopulse radar, the angular deviation in space is measured in two mutually perpendicular planes. The intersection of these two planes coincides with the optical axis O of the antenna system used to carry out the measurement. As shown in FIG. 1, two separate antenna radiation patterns are produced in each plane by means of two feeds which are displaced from the focal point of a parabolic reflector, these radiation patterns intersecting at a certain angle in the optical axis of the antenna system. The line of sight Z to the target intersects the two radiation patterns at two points of intersection A and B. If the target is located in the optical axis of the antenna system, the signals reflected by the target and received via the two channels pertaining to the respective feeds will have the same amplitude. If, however, there is an angular deviation of the target with respect to the reference line, i.e., if the line of sight Z is at an angle with the optical axis O, the signals received through the two channels will be of different amplitude. An error signal, which is dependent on the angular deviation, can then be derived by forming the quotient $$(A-B)/(A+B)$$

where A and B represent the amplitudes of the signals in the two channels. This quotient is proportional to the angular deviation of the line of sight from the optical axis of the antenna system, in the plane in which the measurement is taken. A similar measurement is carried out in the other plane.

In the case of conical scanning with a single feed and a single measuring channel, a radiation pattern is produced whose electrical axis forms a given angle $\phi$ with the optical axis of the antenna system. The space about the antenna is scanned conically by rotating the antenna radiation pattern about the optical axis of the antenna system at an angular velocity $\omega$. If the target is not on the optical axis of the antenna system, a sinusoidal amplitude modulation is obtained whose modulation factor is proportional to the angle between the line of sight and the optical axis, while the phase of the modulation, taken with reference to the zero phase, represents the location of the line of sight. The zero phase is obtained by means of a reference generator which is locked to the antenna system.

The monopulse radar system has the advantage that intentional as well as incidental distortion of the receiving field strength are eliminated due to the fact that a quotient is formed. The drawback, however, is that the system becomes very elaborate, so much so as to become prohibitive particularly in the case of smaller pieces of equipment, e.g., search heads, for reasons of space as well as economy.

The conical scanning has the drawback that it is less immune to hostile electronic counter measures (ECM). If the radar is used for military purposes, and if the hostile forces know the scanning frequency, electronic counter measures can be used to radiate an amplitude modulated wave of the same frequency, thereby to simulate a non-existent target. Due to the fact that the antenna control system has a very narrow band, jamming is possible only in the immediate vicinity of the scanning frequency. The possible jamming range is of the order of one cycle per second, this range being dependent only on the band width of the antenna control circuit, but being independent of the absolute value of the scanning frequency. It is for this reason that a system operating on the conical scanning principle must, if it be rendered reasonably jam- and noise-proof, work at as high a scanning frequency as possible, and also, means must be provided for varying the scanning frequency as much as possible during operation.

Another drawback of the conical scanning system, and one which becomes particularly significant in the case of Doppler radar, is that the received signal including the side bands has to be handled without any phase distortion. This means that the speed gate of a Doppler radar has to have as its minimum width a width which is greater than the difference between the two side bands. On the other hand, in order to improve the speed gating and the sensitivity, the band width of a Doppler radar system should be as small as possible. Thus, the requirements of high scanning frequency and narrow band width are mutually contradictory.

It is, therefore, the primary object of the present invention to provide a way in which the above-described drawbacks are overcome, namely, to provide an arrangement for determining the angular deviation of a target from a straight reference line, which arrangement is of basically simple construction, which is resistant to noise and jamming, and which allows the band width of the speed gate, particularly in the case of Doppler radar, to be narrow, thereby to avoid the drawbacks of conventional arrangements.

With the above objects in view, the present invention relates to a system for determining the angular deviation of a target from a reference line, and includes an antenna arrangement which is switchable between at least two states in which the antenna arrangement produces at least two respective radiation patterns having axes of symmetry that form angles with the optical axis of the antenna arrangement. There are means connected to the antenna arrangement for switching the same between its states, as well as means forming a single receiving channel connected, at its input end, to the antenna arrangement. Separating means are arranged at the output end of the channel and are synchronized with the switching means for separating the signals passing through the channel into separate signal trains each pertaining to a respective state of the antenna arrangement. Also, there are means connected to the output of the separating means for determining the amplitude relationship of successive separated signals, thereby to derive an error signal which is proportional to the angular deviation.

In order to determine the angular deviation in three dimensions, the scanning takes place in two planes but, in contradistinction to monopulse radar, one does not concern oneself with two patterns simultaneously in each plane, instead, there is but a single radiation pattern which is changed over, pulse by pulse, symmetrically with respect to the optical axis of the antenna system.

The present invention further resides in the provision of an antenna arrangement which is particularly suited for use in the above-described system, which antenna arrangement comprises a main reflector, a primary feed, an auxiliary reflector positioned to reflect signals from the main reflector to the primary feed, and means for electrically changing the center of reflection of the auxiliary reflector. These changing means are in the form of one or more wave guides which open at the surface of the auxiliary reflector, i.e., the mouths of these wave guides are located at said surface, there being means for changing the effective electrical length of these wave guides. This, as will be described below, changes the reflection characteristics and hence moves the center of reflection.

The present invention is particularly applicable for use in conjunction with small antenna systems, e.g., a search head.

Additional objects and advantages of the present invention will become apparent upon consideration of the following description when taken in conjunction with the accompanying drawings in which:

FIG. 1, already referred to above, serves to illustrate the angular deviation of the target, as meant throughout the instant specification and claims.

Figure 2:
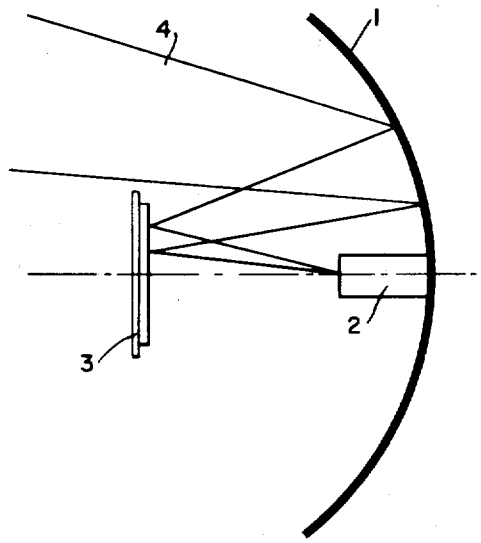
FIG. 2 is a diagrammatic side elevation, in section, of a search head.
Figure 3:
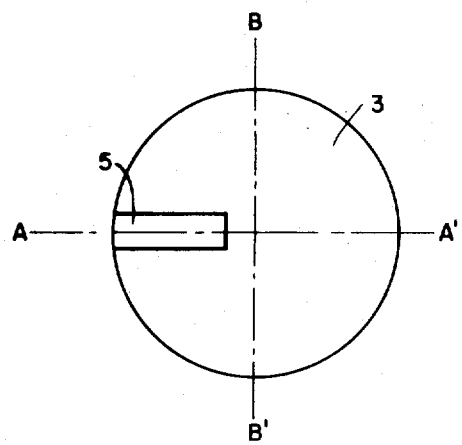
FIG. 3 is a frontal view, used for explanatory purposes, of an auxiliary reflector of a search head incorporating a wave guide.
Figure 4:
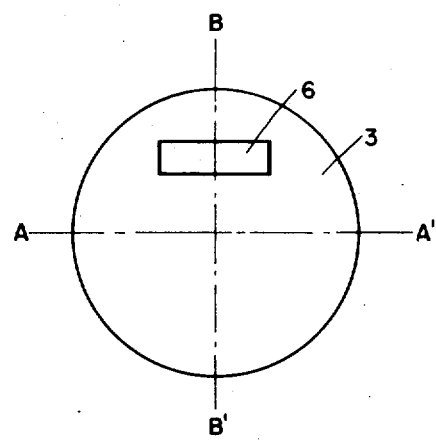
FIG. 4 is a frontal view, also used for explanatory purposes, of an auxiliary reflector incorporating a differently positioned wave guide.
Figure 5:
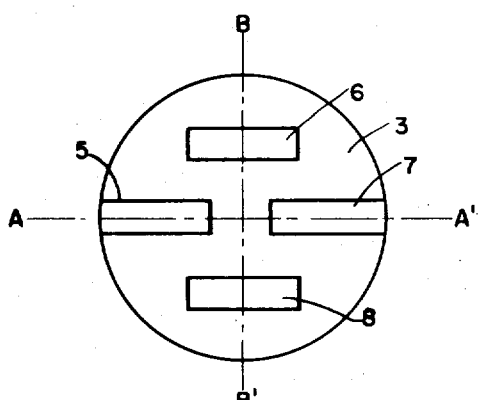
FIG. 5 is a frontal view of an auxiliary reflector in a search head used in a radar system according to the present invention.

Referring once again to the drawings and now to FIG. 2 thereof, the same shows an antenna comprising a parabolic main reflector 1, a dielectric radiator or feed 2, and a disc-shaped auxiliary reflector 3. An incoming signal such as a wave 4 received by the antenna is reflected by the parabolic reflector 1 onto the auxiliary reflector 3 and from there to the feed 2. If the structure is made completely symmetrical, there will be obtained a rotation-symmetric radiation pattern whose electrical axis coincides with the optical axis of the antenna system. If, however, as shown for example in FIG. 3, the auxiliary reflector 3 incorporates a wave guide 5 which opens at the surface of reflector 3, and if it is assumed that the wave striking the auxiliary reflector 3 is a vertically polarized wave, the following will apply: that portion of the energy of the wave which strikes the metal disc 3 is, upon being reflected, phase shifted by 180°. That portion of the wave energy which strikes the wave guide 5 enters this wave guide. If this wave guide has a length of $\lambda_H/2$ ($\lambda_H$ = wave length of the wave guide) and if its end away from its open end is short-circuited, the portion of the energy entering the wave guide will, as it travels from the open end of the wave guide to its short-circuited end and back to the open end at disc 3, be phase-shifted by 360° solely because of the electrical length $2 \cdot \lambda_H/2$ of the way of travelling. The wave will additionally be phase-shifted by 180° at the short-circuited end, so that the net result will be that the wave guide 5 reflects the energy phase shifted by 180°, exactly as does the auxiliary reflector disc 3 which surrounds the wave guide. The wave guide will thus be seen to have had no effect insofar as the phase of the reflected wave is concerned. If, however, the wave guide were to have an electrical length $\lambda_H/4$, the total phase shift would be 360°, so that such a wave guide would reflect that portion of the energy which impinges on it with the same phase as the impinging wave. But since the disc surrounding such a wave guide reflects so much of the wave as strikes the disc with a phase shift of 180°, the wave reflected by the wave guide will be out of phase, by 180°, with respect to the wave reflected by the disc 3. The center of reflection of the components 3, 5, will thus have been shifted away from the side on which the wave guide is located, i.e., the side at which the wave guide is located appears weaker and the electrical axis of the pattern undergoes a deflection in the direction of this weaker side. Thus, if the length of the wave guide 5 is switched by $\lambda_H/4$, the pattern is deflected, by a given angle, in the plane A–A'. If, as shown in FIG. 4, a $\lambda_H/2$ wave guide 6 is provided in the "12 o'clock" position, as viewed in FIG. 4, the radiation pattern can be deflected, by a certain angle, in the plane B–B' by shortening this wave guide 6 by $\lambda_H/4$. If, as shown in FIG. 5, four wave guides 5, 6, 7, 8 are arranged at the 3 o'clock, 6 o'clock, 9 o'clock and 12 o'clock positions, the radiation pattern can, by switching (i.e., shortening by $\lambda_H/4$) the wave guides 5 and 7, be deflected back and forth symmetrically in the plane A–A', while switching of the wave guides 6 and 8 will cause the pattern to be deflected back and forth symmetrically in plane B–B'.

Figure 6A:
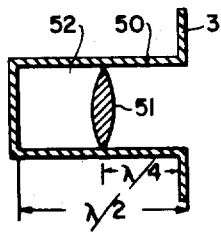
FIGS. 6a, 6b and 6c are sectional views showing, respectively, three embodiments of means for changing the electric length of a wave guide used in the present invention.
Figure 6B:
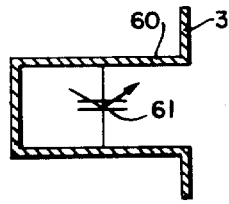
Figure 6C:
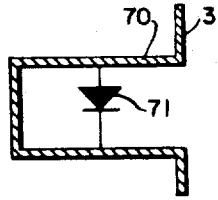

FIGS. 6a, 6b and 6c show three ways in which the wave guides can be electrically shortened:

As shown in FIG. 6a, a wave guide 50, having an electrical length of $\lambda_H/2$, is provided at $\lambda_H/4$ with a gas-tight diaphragm which itself has no effect on the wave propagation. The chamber 52 formed between the short-circuited end 53 of the wave guide and the diaphragm 51 is filled with a rare gas, so that when this gas is ionized — in a manner well known per se — the short-circuit plane will effectively move from 53 to 51, so that the wave guide now has an effective length of $\lambda_H/4$.

As shown in FIG. 6b, the wave guide 60 is provided with a microwave capacitance diode 61. The effective electrical length of the wave guide can be changed by controlling this reactance diode.

As shown in FIG. 6c, the wave guide 70 is provided with a microwave resistance diode 71, known as a PIN diode (PIN standing for positive-intrinsic-negative).

Such PIN diodes are microwave resistance diodes whose resistance can be varied by a ratio of 1:500 by means of biassing.

All three of the above means for shortening the effective electrical length of the wave guides have relatively short reaction times, so that the scanning frequency at which the system operates can be high.

Figure 1:
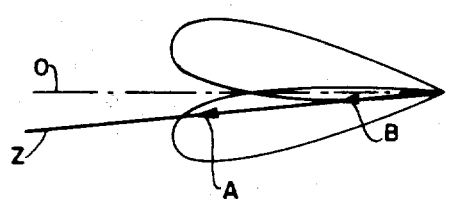
Figure 7:
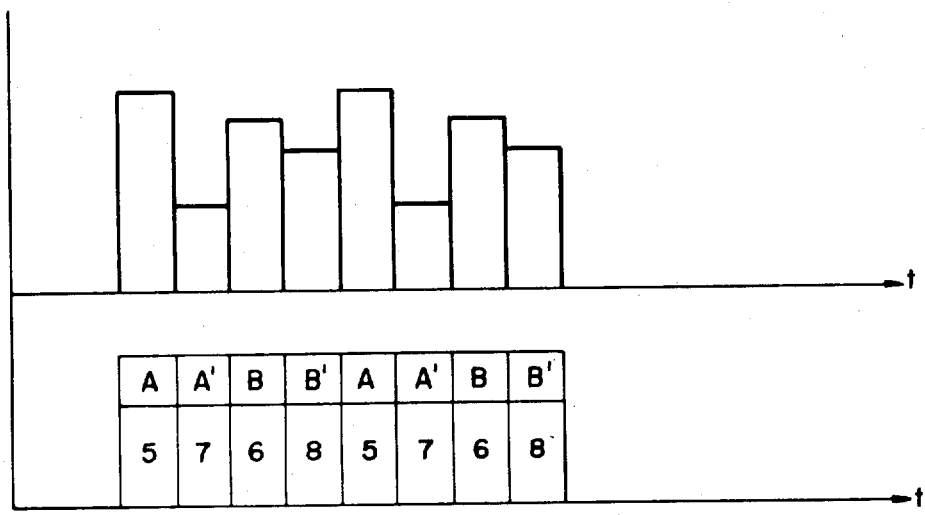
FIG. 7 is a graph showing the pulse timing.

If the wave guide arrangement of FIG. 5 is switched by means of a pulse generator, for example in the sequence 5-7-6-8 the pulse train coming through the single receiving channel is as shown in FIG. 7. When the wave guide 5 is switched, the radiation pattern flips, in plane A-A', in the direction A. The amplitude of the received signal is obtained from the intersection of the antenna pattern with the line of sight to the target, as shown in the above-described FIG. 1. When the wave guide 7 is switched to its shorter length, the pattern flips over in the direction A, so that a second pulse is obtained. If the projection of the line of sight onto plane A-A' does not coincide with the optical axis of the antenna, the amplitudes of the two pulses will be different. An error signal can be derived by forming a quotient.

The frequency with which the change-over from one side to the other is effected can be varied in any desired manner. For example, the antenna arrangement may be maintained in each of its states throughout equal time intervals, or it may be maintained in each of its states throughout unequal time intervals such that, over a plurality of change-overs, the average of the total time through which the antenna arrangement is in each state is the same. Also, the sequence in which the change-over is effected can be selected as desired. The system is thus exceptionally proof against noise and jamming.

In the case of large antennas, four separate primary radiators can be used — as in the case of a monopulse system — which primary radiators, however, are pulsed by the same electronic components as those shown in FIGS. 6a to 6c. While, in principle, the wave guides, or the radiators, as the case may be, can be switched over mechanically, experience has shown that, at high change-over frequencies, the mechanical inertia is too high, so that electronic switch-over means are preferable.

Figure 8:
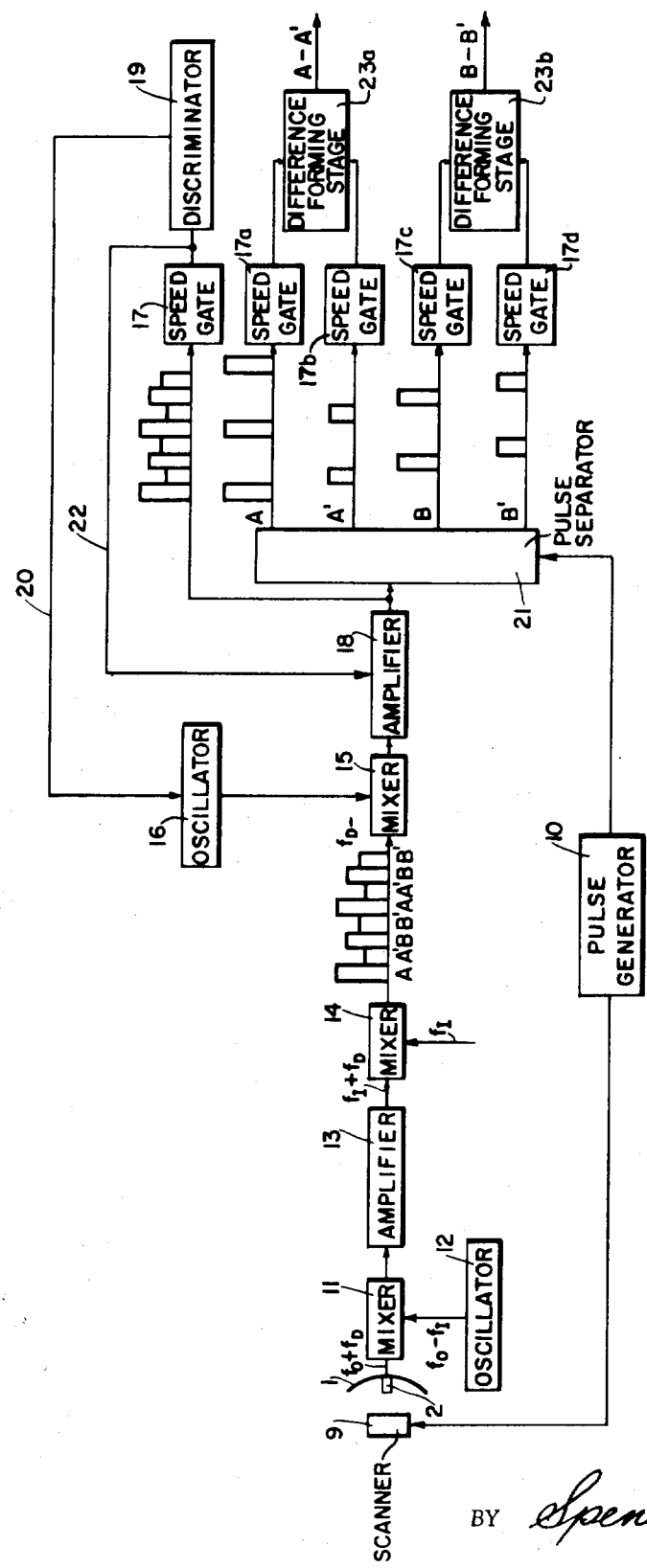
FIG. 8 is a block diagram of a radar system incorporating the present invention.

FIG. 8 is a block diagram of a complete Doppler radar system according to the present invention. This figure shows the main dish 1 and radiator 2 of an antenna, as well as a scanner 9 which incorporates the above-described auxiliary reflector 3 and wave guides 5, 6, 7, 8 (FIG. 6). These wave guides are switched, either statistically or in accordance with any desired predetermined program, from a pulse generator 10. The thus produced pulse train has a carrier frequency $f_o + f_D$, $f_D$ being the Doppler frequency which is produced as the result of the motion of the target relative to the radar site, i.e., that component of the speed of the target which is radial with respect to the radar antenna. This pulse train is applied to one input of a mixer 11 to whose other input is applied the output of a local oscillator 12 which operates at a frequency $f_o - f_I$, so that the output of the mixer is a frequency $f_I + f_D$. This pulse modulated output is amplified by an IF (Intermediate frequency) amplifier 13, and is applied to one input of a further mixer 14. The other input of this mixer 14 has applied to it the intermediate frequency $f_I$, so that output mixer 14 is the Doppler frequency $f_D$. The pulse train put out by mixer 14 is applied to one input of a third mixer 15, whose other input has applied to it the output of a further local oscillator 16, so that the Doppler frequency is raised to the frequency of a speed gate 17 consisting of a frequency filter with a very narrow band width and operating as integrating means. The output of mixer 15 is applied to this speed gate 17 via an amplifier 18. The output of speed gate 17 is applied to a discriminator 19 which is connected to the local oscillator 16 via a line 20, in order continuously to tune the same such that the frequency of the signal always remains within the band of the speed gate 17.

The pulse train put out by mixer 15 is also applied, via amplifier 18, to a pulse separator 21 which is controlled by the pulse generator 10. It is here that the pulse train is separated into four trains and directed into four channels A, A', B, B'. The information concerning the deviation of the line of sight of the target from the optical axis of the antenna system is to be found in the amplitudes of the four pulse trains. Each pulse train is applied to its own speed gate 17a, 17b, 17c, 17d, which speed gates have the same characteristics as does speed gate 17. These speed gates may consist of filters having very narrow bands since, in contradistinction to conical scanning, no attention has to be paid to the phase. All that is required of the filters is that they accurately transmit the amplitude of the applied signals, so that the amplitudes of the output signals taken off the speed gates 17a, 17b, 17c, 17d, will be proportional to the amplitudes of the signals passing through the four pulse channels.

The error signal in, for example, plane A-A', can now be derived by forming the quotient:

$$(A - A')/A + A')$$

with A and A' representing the amplitudes in the two channels. But, in the circuit of FIG. 8, the actual formation of the quotient can be dispensed with by controlling the amplifier 18, via an automatic gain control line 22 connected to the output of the speed gate 17, such that the output of amplifier 18 is kept to a constant average value. This forces a normalization of the pulse trains in the four channels, in consequence of which the error signal, in each plane, can be obtained by forming a difference. This is effected in the difference forming stages 23a and 23b, connected, respectively, to the outputs of gates 17a, 17b, and 17c, 17d, to produce error signals for each of the two planes A-A' and B-B'.

The pulse scanning thus operates at any frequency, which makes it possible to render the system very noise- and jam-proof. Furthermore, the band widths of the speed gates can be kept very narrow — this, due to the fact that the speed gates are required to be accurate only insofar as amplitude is concerned, without regard to phase — despite the fact that the system operates at high scanning frequency, which, it will be remembered from the introduction to this specification, were heretofore considered to be mutually contradictory requirements. Consequently, the locating characteristics of the radar set, and, more particularly, its search head, are improved.

Figure 9:
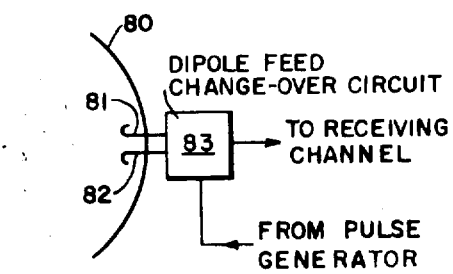
FIG. 9 is a diagrammatic illustration of a two-feed antenna arrangement which may be used in conjunction with the present invention.

FIG. 9 shows an antenna arrangement incorporating a main dish or reflector 80 and two feeds such as dipoles 81 and 82 arranged in a plane parallel to the reflector aperture and spaced from the focal point of the reflector. The feeds are connected to a change-over circuit 83 which is actuated by the pulses coming from the pulse generator 10 of FIG. 8, and which applies the signals from the respective feeds, in accordance with the pulses received from generator 10, to the receiving channel.

It will be understood that the above description of the present invention is susceptible to various modifications, changes and adaptations, and the same are intended to be comprehended within the meaning and range of equivalents of the appended claims.

What is claimed is:

1. In a system for determining the angular deviation of a target from a reference line, the combination which comprises: an antenna arrangement which is switchable between at least two states in which said antenna arrangement produces at least two respective radiation patterns having axes of symmetry that form angles with the optical axis of the antenna arrangement; means connected to said antenna arrangement for switching the same between said states, said switching means maintaining said antenna arrangement in each of its states throughout equal time intervals; means forming a single receiving channel connected, at its input end, to said antenna arrangement; automatic gain control means responsive to the average value of the amplitudes of the non-separated signals for amplifying the same; separating means arranged at the output end of said channel and synchronized with said switching means for separating the amplified signals passing through said channel into separate signal trains each pertaining to a respective state of said antenna arrangement; and means connected to the output of said separating means for determining the amplitude relationship of successive separated signals, thereby to derive an error signal which is proportional to said angular deviation.

2. The combination defined in claim 1, wherein said means for determining the amplitude relationship of successive separate signals incorporate means for determining the amplitude difference.

3. In a system for determining the angular deviation of a target from a reference line, the combination which comprises: an antenna arrangement which is switchable between at least two states in which said antenna arrangement produces at least two respective radiation patterns having axes of symmetry that form angles with the optical axis of the antenna arrangement; means connected to said antenna arrangement for switching the same between said states, said switching means maintaining said antenna arrangement in each of its states throughout unequal intervals such that, over a plurality of change-overs, the average of the total time through which said antenna arrangement is in each state is the same; means forming a single receiving channel connected, at its input end, to said antenna arrangement; separating means arranged at the output end of said channel and synchronized with said switching means for separating the signals passing through said channel into separate signal trains each pertaining to a respective state of said antenna arrangement; and means connected to the output of said separating means for determining the amplitude relationship of successive separated signals, thereby to derive an error signal which is proportional to said angular deviation.

4. The combination defined in claim 3, further comprising automatic gain control means responsive to the average value of the amplitude of the non-separated signals throughout a plurality of change-overs for amplifying said signals prior to their separation.

5. The combination defined in claim 4 wherein said means for determining the amplitude relationship of successive separated signals incorporate means for determining the amplitude difference over a plurality of change-overs.

6. In a system for determining the angular deviation of a target from a reference line, the combination which comprises: an antenna arrangement which is switchable between at least two states in which said antenna arrangement produces at least two respective radiation patterns having axes of symmetry that form angles with the optical axis of the antenna arrangement, said antenna arrangement comprising a main reflector, a primary feed, an auxiliary reflector positioned to reflect signals from said main reflector to said primary feed, and switching means for electrically changing the center of reflection of said auxiliary reflector and thereby for switching said antenna arrangement between said states; means forming a single receiving channel connected, at its input end, to said antenna arrangement; separating means arranged at the output end of said channel and synchronized with said switching means for separating the signals passing through said channel into separate signal trains each pertaining to a respective state of said antenna arrangement; and means connected to the output of said separating means for determining the amplitude relationship of successive separated signals, thereby to derive an error signal which is proportional to said angular deviation.

7. The combination defined in claim 6 wherein said means for changing the center of reflection comprise at least one wave guide opening at the surface of said auxiliary reflector, short-circuit means spaced $\lambda_H/2$ ( $\lambda_H = $ wave length of the wave guide) from the opening of the wave guide at said surface of said auxiliary reflector, and electrically activatable further short-circuit means spaced $\lambda_H/4$ from said opening of said wave guide, in consequence of which the effective electrical length of said wave guide may be changed, whenever desired, between $\lambda_H/2$ and $\lambda_H/4$, whereby the reflection characteristics of said auxiliary reflector may be changed.

8. The combination defined in claim 7 wherein said electrically activatable short-circuit means comprise a PIN diode.

9. The combination defined in claim 7 wherein said electrically activatable short-circuit means comprise a capacitance diode.

10. The combination defined in claim 7 wherein said electrically activatable short-circuit means comprise a gas-tight diaphragm which itself has no effect on wave propagation, said diaphragm forming with said $\lambda_H/2$ short-circuit means a gas-tight chamber, and an inert gas in said chamber, whereby when the gas is ionized, the short-circuit plane of the wave guide is moved toward its opening and the effective length of the wave guide is $\lambda_H/4$.

11. The combination defined in claim 7 wherein said auxiliary reflector includes at least two wave guides located diametrically opposite each other with respect to the center of said auxiliary reflector.

12. The combination defined in claim 7 wherein said auxiliary reflector includes two pairs of wave guides, the wave guides of each pair being located diametrically opposite each other with respect to the center of said auxiliary reflector.

13. The combination defined in claim 12 wherein the two pairs of wave guides are arranged along lines which form right angles with each other.

14. The combination defined in claim 7 wherein said auxiliary reflector is a disc.

15. An antenna arrangement comprising, in combination: a main reflector, a primary feed, an auxiliary reflector positioned to reflect signals from said main reflector to said primary feed, and means for electrically changing the center of reflection of said auxiliary reflector and comprising at least one wave guide opening at the surface of said auxiliary reflector, short-circuit means spaced $\lambda_H 12$ ($\lambda_H$ = wave length of the wave guide) from the opening of the wave guide at said surface of said auxiliary reflector, and electrically activatable further short-circuit means spaced $\lambda_H/4$ from said opening of said wave guide, in consequence of which the effective electrical length of said wave guide may be changed, whenever desired, between $\lambda_H/2$ and $\lambda_H/4$, whereby the reflection characteristics of said auxiliary reflector may be changed.

16. An antenna arrangement as defined in claim 15 wherein said electrically activatable short-circuit means comprise a PIN diode.

17. An antenna arrangement as defined in claim 15 wherein said electrically activatable short-circuit means comprise a capacitance diode.

18. An antenna arrangement as defined in claim 15 wherein said electrically activatable short-circuit means comprise a gas-tight diaphragm which itself has no effect on wave propagation, said diaphragm forming with said $\lambda_H/2$ short-circuit means a gas-tight chamber, and an inert gas in said chamber, whereby when the gas is ionized, the short-circuit plane of the wave guide is moved toward its opening and the effective length of the wave guide is $\lambda_H/4$.

19. An antenna arrangement as defined in claim 15 wherein said auxiliary reflector includes at least two wave guides located diametrically opposite each other with respect to the center of said auxiliary reflector.

20. An antenna arrangement as defined in claim 15 wherein said auxiliary reflector includes two pairs of wave guides, the wave guides of each pair being located diametrically opposite each other with respect to the center of said auxiliary reflector.

21. An antenna arrangement as defined in claim 20 wherein the two pairs of wave guides are arranged along lines which form right angles with each other.

22. An antenna arrangement as defined in claim 15 wherein said auxiliary reflector is a disc.

23. In combination: a reflector and means for electrically changing the center of reflection of the reflector, said means comprising at least one wave guide opening at the surface of said reflector, short-circuit means spaced $\lambda_H/2$ ($\lambda_H$ = wave length of the wave guide) from the opening of the wave guide at said surface of said reflector, and electrically activatable further short-circuit means spaced $\lambda_H/4$ from said opening of said wave guide, in consequence of which the effective electrical length of said wave guide may be changed, whenever desired, between $\lambda_H/2$ and $\lambda_H/4$, whereby the reflection characteristics of said reflector may be changed.

24. In a system for determining the angular deviation of a target from a reference line, which system incorporates an antenna arrangement having a reflector and two feeds that are arranged in a plane parallel to the reflector aperture and that are displaced from the focal point of the reflector for producing antenna radiation patterns having axes of symmetry that form angles with the optical axis of the antenna arrangement, such axis constituting the reference line, the improvement which comprises: means forming a single receiving channel; means for alternately connecting said feeds to said single receiving channel which is thus common to both of said feeds, said feeds being connected to said common feed channel throughout equal time intervals; automatic gain control means responsive to the average value of the amplitudes of the non-separated signals for amplifying the same; means arranged at the output end of said receiving channel for separating the received and amplified signals pertaining to said feeds; and means connected to the output of said separating means for determining the amplitude relationship of successive separated signals, thereby to derive an error signal which is proportional to said angular deviation.

25. The improvement defined in claim 24 wherein said means for determining the amplitude relationship of successive separate signals incorporate means for determining the amplitude difference.

26. In a system for determining the angular deviation of a target from a reference line, which system incorporates an antenna arrangement having a reflector and two feeds that are arranged in a plane parallel to the reflector aperture and that are displaced from the focal point of the reflector for producing antenna radiation patterns having axes of symmetry that form angles with the optical axis of the antenna arrangement, such axis constituting the reference line, the improvement which comprises: means forming a single receiving channel; means for alternately connecting said feeds to said single receiving channel which is thus common to both of said feeds, said feeds being connected to said common feed channel throughout unequal time intervals such that, over a plurality of change-overs, the average of the total time throughout which each feed is connected to said common channel is the same; means arranged at the output end of said receiving channel for separating the received signals pertaining to said feeds; and means connected to the output of said separating means for determining the amplitude relationship of successive separated signals, thereby to derive an error signal which is proportional to said angular deviation.

27. The improvement defined in claim 26, further comprising automatic gain control means responsive to the average value of the amplitude of the non-separated signals throughout a plurality of change-overs for amplifying said signals prior to their separation.

28. The improvement defined in claim 27 wherein said means for determining the amplitude relationship of successive separated signals incorporate means for determining the amplitude difference over a plurality of changeiovers.

* * * * *